(12) United States Patent
Xiang

(10) Patent No.: US 9,018,899 B2
(45) Date of Patent: Apr. 28, 2015

(54) WIRELESS CHARGING DEVICE

(75) Inventor: Zhiyong Xiang, Guangdong (CN)

(73) Assignee: Kimree Hi-Tech Inc., Tortola (VG)

( * ) Notice: Subject to any disclaimer, the term of this patent is extended or adjusted under 35 U.S.C. 154(b) by 0 days.

(21) Appl. No.: 13/519,859

(22) PCT Filed: Jan. 28, 2011

(86) PCT No.: PCT/CN2011/070773
§ 371 (c)(1),
(2), (4) Date: Jun. 28, 2012

(87) PCT Pub. No.: WO2012/100431
PCT Pub. Date: Aug. 2, 2012

(65) Prior Publication Data
US 2013/0300350 A1    Nov. 14, 2013

(51) Int. Cl.
*H02J 7/00* (2006.01)
*A24F 47/00* (2006.01)
*H02J 5/00* (2006.01)
*H02J 7/02* (2006.01)

(52) U.S. Cl.
CPC ............... *A24F 47/002* (2013.01); *A24F 47/00* (2013.01); *H02J 5/005* (2013.01); *H02J 7/025* (2013.01); *A24F 47/008* (2013.01)

(58) Field of Classification Search
CPC ........................................................ H02J 7/025
USPC .......................................... 320/108, 107, 115
See application file for complete search history.

(56) References Cited

U.S. PATENT DOCUMENTS

| | | | | |
|---|---|---|---|---|
| 5,144,962 A | * | 9/1992 | Counts et al. | 131/194 |
| 5,269,327 A | * | 12/1993 | Counts et al. | 131/194 |
| 2004/0261802 A1 | * | 12/2004 | Griffin et al. | 131/194 |
| 2009/0283103 A1 | * | 11/2009 | Nielsen et al. | 131/273 |
| 2010/0181842 A1 | * | 7/2010 | Suzuki et al. | 307/104 |
| 2012/0227753 A1 | * | 9/2012 | Newton | 131/347 |

FOREIGN PATENT DOCUMENTS

| | | |
|---|---|---|
| CN | 2400954 Y | 10/2000 |
| CN | 201134682 Y | 10/2008 |
| CN | 101557127 A | 10/2009 |
| CN | 201384062 Y | 1/2010 |
| EP | 1989946 A1 | 11/2008 |
| KR | 20090008914 U | 9/2009 |

* cited by examiner

*Primary Examiner* — Richard V Muralidar
(74) *Attorney, Agent, or Firm* — Morris Manning & Martin LLP; Tim Tingkang Xia, Esq.

(57) ABSTRACT

A wireless charging device comprises an electronic switch and a transmitting coil (L1) electrically connected with a power source in sequence. A control end of the electronic switch is connected with a transmitting control unit. The wireless charging device further comprises a current limiting resistance (R1) connected in serial with the transmitting coil. The wireless charging device further comprises a compensation capacitor (C1) connected in parallel with the transmitting coil. An insert total electromagnetic coupling structure is further employed for charging. Such wireless charging device is particularly suitable for electronic cigarette, with low cost, stable and reliable working status and high efficiency, and specific heat sink is not required.

9 Claims, 3 Drawing Sheets

WIRELESS CHARGING DEVICE

FIELD OF THE PRESENT INVENTION

The present invention relates to wireless charging technique, more particularly to a wireless charging device with low cost and high efficiency, especially be suitable for electronic cigarette.

BACKGROUND OF THE PRESENT INVENTION

At present, a wireless charging device comprises a power source, an electronic switch, and a transmitting coil electrically connected in sequence. Switch on/off of the electronic switch is controlled by a Pulse Width Modulation (PWM) controller. The transmitting coil is connected to the power source through the electronic switch. A field-effect switching tube with high power usually serves as the electronic switch mentioned above. Because a high heat value can be generated on the electronic switch due to a dynamic resistance, heat sinks with large area are needed to regulate the work of the electronic switch, which increases the cost and is especially adverse to product with low cost and small size. According to a traditional method of preparing a wireless charging device for electronic cigarette, heat sinks are required. The heat sink has an effective heat release area of more than $3*3$ cm², and the cost is about 2 RMB. Furthermore, the current transmitting coil doesn't transmit and the receiving efficiency is rather low when the electronic switch is off, both causing extra heat generation of the field-effect switching tube.

SUMMARY OF THE PRESENT INVENTION

The present invention aims to solve the foregoing problems, and provide a wireless charging device. Heat generation of the electronic switch of the wireless charging device is reduced, and the heat sink is greatly reduced in area or even removed.

According to an aspect of the present invention, a wireless charging device is provided. The wireless charging device comprises an electronic switch and a transmitting coil electrically connected with a power source in sequence. A control end of the electronic switch is connected with a transmitting control unit. The wireless charging device further comprises a current limiting resistance connected in serial with the transmitting coil. Compared to the traditional solution, the additional current limiting resistance limits and reduces the current passing through the electronic switch, thus effectively decreasing the heat generation on the electronic switch. In that way, the burning out of the electronic switch can be prevented. Further, because the current limiting resistance has a rather small resistance value of about 1-5 ohm (a static resistance has a small resistance of about 0.01-0.5 ohm), it can even be ignored compared with a dynamic resistance which has a resistance value as large as 20-100 ohm. Therefore, problems like power losses, low transmitting efficiencies, and low receiving efficiencies exist in the prior art can be avoided. In addition, high heat generation on resistances by traditional solution can also be prevented.

In an embodiment of the present invention, the wireless charging device further comprises a compensation capacitor connected in parallel with the transmitting coil. Thus due to the control of the PWM, a transmitting process can either be performed when the electronic switch is on, or be achieved while the switch is off (improving the transmitting efficiency), since the transmitting coil and the compensation capacitor form a circuit. While the electronic switch is off, it does not generate heat because there is no current passes through. Therefore, when the transmitting power is identified (by reducing the duty cycle of the switching tube), current passing through the electronic switch is significantly reduced and the heat generation on the electronic switch is also decreased, so as to improve the stability of the circuit.

Wherein, said compensation capacitor is a monomer capacitor or a combination capacitor.

Wherein, said electronic switch uses a heat sink with small area. In a non-limiting embodiment, said electronic switch is a direct insertion element mounted closely to the heat sink. Advantageously, specific heat sinks is not applied. Said electronic switch is a surface mounted element, and copper sheets are provided instead of the heat sinks in a large area ($2*2$ cm²) at the position corresponding to said heat-generable electronic switch on the internal circuit board. Then the cost may be reduced to as low as about 0.3 RMB.

Said wireless charging device is used to charge an electronic cigarette, further comprising an inserting hole or a sleeve coupled with the electronic cigarette. An insert total electromagnetic coupling structure is therefore formed, which has greatly improved the receiving efficiency and efficiently reduced the current passing through the electronic switch.

Said wireless charging device further comprise a photo detector provided in the inserting hole or the sleeve. The photo detector is electrically connected with the transmitting control unit.

There is one or more transmitting coils and corresponding inserting holes and the sleeves, so as to charge multiple electronic cigarette simultaneously.

Said electronic switch comprises, but is not limited to, a field-effect switching tube or a triode.

Said current limiting resistance is a monomer resistance, or a combination resistance which can be separated into two resistances to further reduce the heat generation in each one.

According to the present invention, a current limiting resistance and a compensation capacitor are applied based on traditional transmitting circuit. An insert total electromagnetic coupling structure and an insert detection are applied, which is particularly suitable for electronic cigarette. Compared to those in the prior art, the wireless charging device according to the present invention provides the following benefits: 1) high efficiency; 2) stable working status; 3) low heat generation, heat sinks could be removed or greatly be reduced in area; and 4) detecting and charging automatically, energy conservative, and environmental friendly.

DETAILED DESCRIPTION OF THE EMBODIMENT

Figure 1:
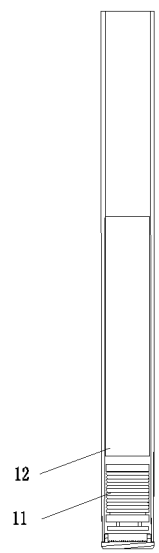
FIG. 1 is a schematic view of an electronic cigarette according to an embodiment of the present invention.

As shown in FIG. 1, an electronic cigarette according to the present invention is provided, comprising a battery 12 installed on the body of the electronic cigarette, and a receiving coil 11 provided on the head part of the electronic cigarette located in front of the battery 12. The receiving coil 11 is also labeled as L2 in FIG. 3 and FIG. 4.

Figure 2:
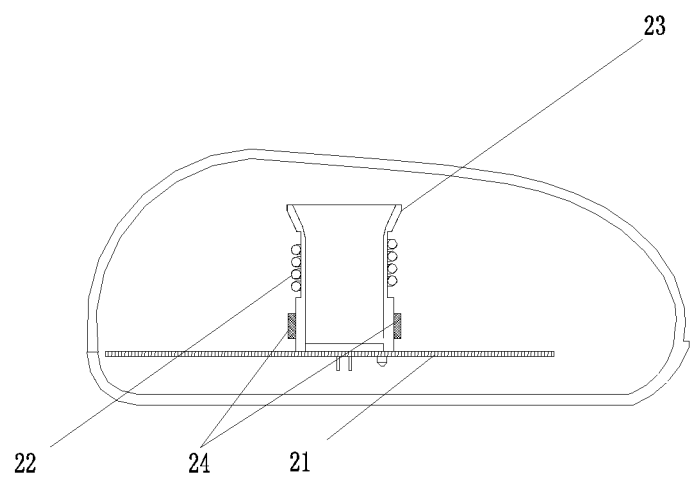
FIG. 2 is a schematic view of a wireless charging device for electronic cigarette according to an embodiment of the present invention.

As shown in FIG. 2, a wireless charging device for the electronic cigarette according to the present invention is provided, comprising a circuit board 21, a sleeve 23, a photo detector 24 for testing the insertion of the electronic cigarette, and a transmitting coil 22. The transmitting coil 22 is also labeled as L1 in FIG. 3 and FIG. 5. The transmitting coil 22 is wrapped outside the sleeve 23, corresponding to the position for inserting the receiving coil 11 of the electronic cigarette. When the electronic cigarette is installed, the receiving coil 11 is inside the transmitting coil 22 with the axes of the two coils in the same direction, thus forming an insert total electromagnetic coupling structure.

Figure 3:
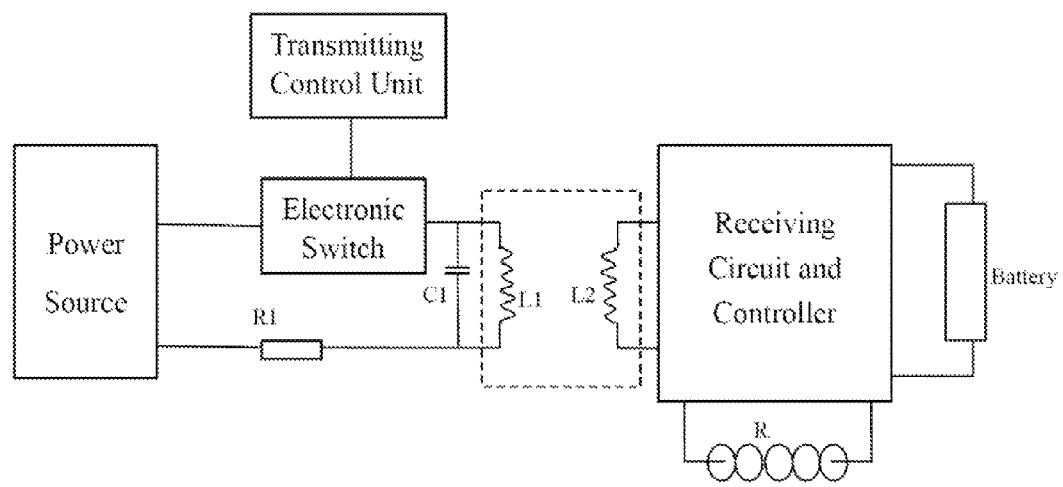
FIG. 3 is a schematic diagram showing the circuit principle of an electronic cigarette and a wireless charging device according to an embodiment of the present invention.

Referring to FIG. 3, the circuit of the electronic cigarette comprises a battery, a heating wire R, a receiving coil L2, and a receiving circuit and a controller containing a rectification unit. The circuit of the wireless charging device comprises an electronic switch and a transmitting coil L1 electrically connected with a power source in sequence. The electronic switch is provided with a transmitting control unit. The transmitting coil L1 and the receiving coil L2 are configured to cooperate with each other.

Figure 4:
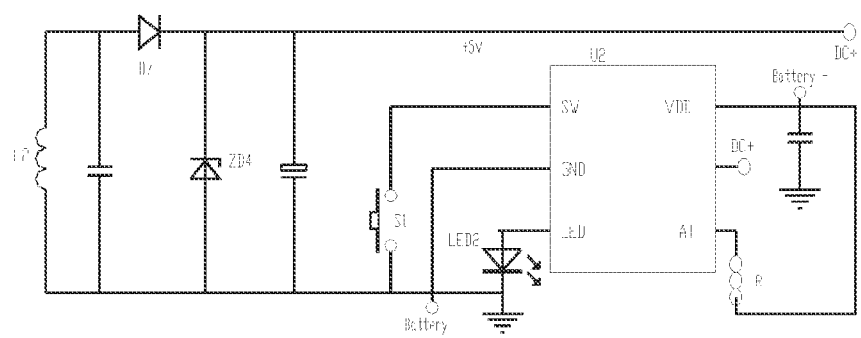
FIG. 4 is a schematic diagram showing the circuit structure of the electronic cigarette in FIG. 3.
Figure 5:
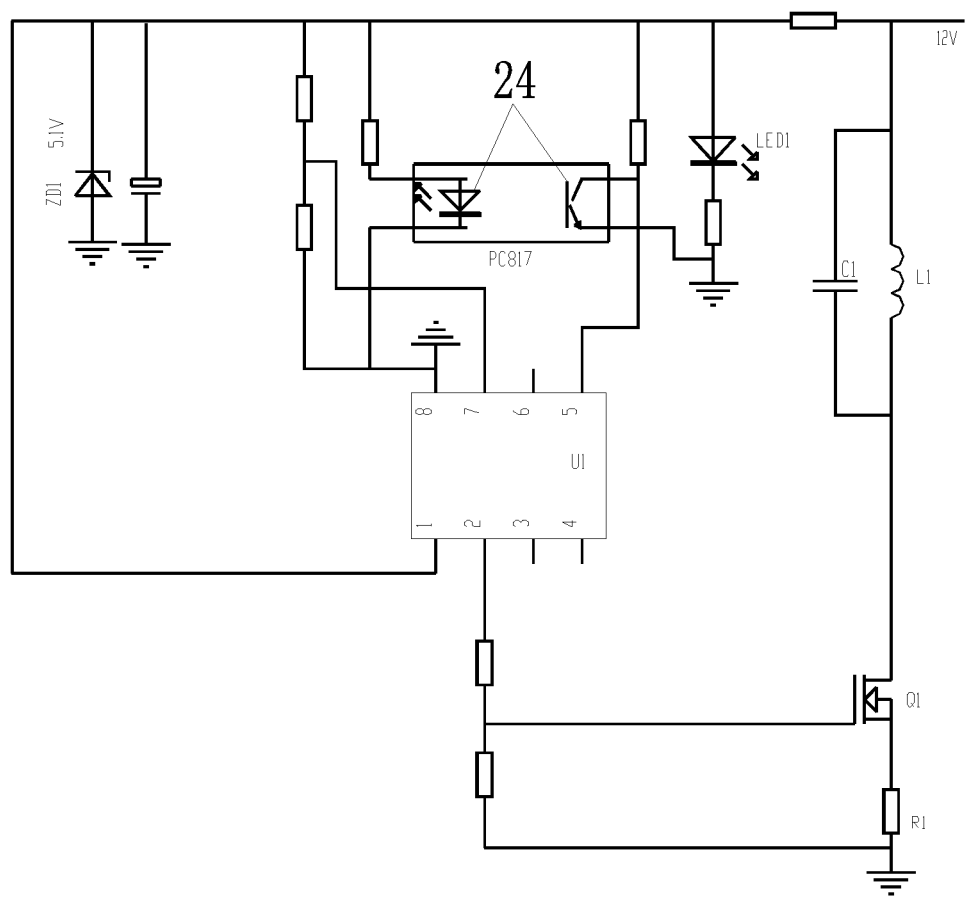
FIG. 5 is a schematic diagram showing the circuit structure of the wireless charging device in FIG. 3.

Referring to FIG. 4 and FIG. 5, detailed circuit structures of the wireless charging circuit and the electronic cigarette are shown. A receiving coil L2 contributed to the charging process, a rectification diode D7, a capacitor, and a voltage regulator diode ZD4 are added into the circuit of a prior electronic cigarette (which comprises a battery, a control chip U2, a heating wire R, and an atomizer switch S1). The wireless charging device comprises a transmitting control chip U1, an electronic switch Q1, a transmitting coil L1, a compensation capacitor C1 connected in parallel with the transmitting coil L1 in order to improve the transmitting efficiency, a current limiting resistor R1 connected in serial with the transmitting coil L1 to reduce a current in the transmitting coil L1 and further reduce the amount of heat sinks, and a photo detector 24 electrically connected with the transmitting control unit U1. The photo detector 24 includes a light emission component and a light receiving component. When the power source is connected, the light emission component constantly emits lights. Once the light receiving component does not receive lights, the transmitting control unit U1 is started to control charging.

According to the present invention, the wireless charging device is particularly suitable for electronic cigarette. In that way, the users are able to smoke while charging. Therefore, the electronic cigarettes can be further promoted, and smokers who are suffered from smoking traditional tobaccos can enjoy smoking without harm to their health in a low cost.

Although explanatory embodiments have been shown and described, it would be appreciated by those skilled in the art that changes, alternatives, and modifications all falling into the scope of the claims and their equivalents may be made in the embodiments without departing from spirit and principles of the present invention.

What is claimed is:

1. A wireless charging device comprising an electronic switch, a transmitting coil (L1) electrically connected with a power source in sequence, a transmitting control unit connected with a control end of the electronic switch, a current limiting resistance (R1) connected in serial with the transmitting coil, an inserting hole or a sleeve (23) coupled with the transmitting coil (L1) and a photo detector (24) provided in the inserting hole or the sleeve (23) and electrically connected with the transmitting control unit;
   the photo detector (24) further includes a light emission component and a light receiving component, wherein when the power source is connected, the light emission component constantly emits lights, and once the light receiving component does not receive lights, the transmitting control unit is started to control charging; and
   wherein the wireless charging device is used for charging an electronic cigarette.

2. The wireless charging device according to claim 1, wherein the wireless charging device further comprises a compensation capacitor (C1) connected in parallel with the transmitting coil (L1).

3. The wireless charging device according to claim 2, wherein the compensation capacitor (C1) is a monomer capacitor or a combination capacitor.

4. The wireless charging device according to claim 2, wherein the electronic switch is a surface mounted element, and copper sheets for releasing heat are provided in a region of an internal circuit board corresponding to a heat generation portion of the electronic switch.

5. The wireless charging device according to claim 2, wherein the electronic switch is a direct insertion element mounted closely to heat sinks.

6. The wireless charging device according to claim 1, wherein the electronic switch is a surface mounted element, and copper sheets for releasing heat are provided in a region of an internal circuit board corresponding to a heat generation portion of the electronic switch.

7. The wireless charging device according to claim 1, wherein the electronic switch is a direct insertion element mounted closely to heat sinks.

8. The wireless charging device according to claim 1, wherein the electronic switch is a field-effect switching tube (Q1) or a triode.

9. The wireless charging device according to claim 1, wherein the current limiting resistance (R1) is a monomer resistance or a combination resistance.

* * * * *